US 6,719,879 B2

(12) United States Patent
Olsen et al.

(10) Patent No.: US 6,719,879 B2
(45) Date of Patent: Apr. 13, 2004

(54) METHOD FOR KRAFT WASTE RECLAMATION

(75) Inventors: Gary Allen Olsen, Tacoma, WA (US); John Carl Stuever, Edmond, OK (US); Susan Candace Stuever, Edmond, OK (US)

(73) Assignee: S & S Lime, Inc., Edmond, OK (US)

( * ) Notice: Subject to any disclaimer, the term of this patent is extended or adjusted under 35 U.S.C. 154(b) by 0 days.

(21) Appl. No.: 10/280,708

(22) Filed: Oct. 24, 2002

(65) Prior Publication Data

US 2003/0053946 A1 Mar. 20, 2003

Related U.S. Application Data

(63) Continuation of application No. 10/022,086, filed on Dec. 18, 2001, now abandoned, which is a continuation of application No. 09/754,754, filed on Jan. 4, 2001, now abandoned, which is a continuation of application No. 09/400,243, filed on Sep. 21, 1999, now abandoned, which is a continuation of application No. 08/861,333, filed on May 21, 1997, now abandoned.

(51) Int. Cl.[7] ........................... D21C 11/00; D21C 11/04
(52) U.S. Cl. ....................................... 162/29; 162/30.11
(58) Field of Search ............................... 162/29, 30.11, 162/130; 423/183, 430, DIG. 3

(56) References Cited

U.S. PATENT DOCUMENTS

| 4,619,733 A | 10/1986 | Kooi |
| 4,668,342 A | 5/1987 | Blackwell |
| 5,244,542 A | 9/1993 | Bown et al. |
| 5,643,415 A | 7/1997 | Wise |

FOREIGN PATENT DOCUMENTS

JP 06073690 3/1994

OTHER PUBLICATIONS

Preparation and Application of Fluid Lime Suspensions for Soil Neutralization, J.R. Wolford and E.W. Sawyer, date unknown.
Alkali Recovery . . . Straw Pulp, 2nd International Conf., Zou, P.C., pp. 895–913, date unknown.
Pulp and Paper, Chemistry and Chemical Technology, James P. Casey, p. 276, Copyright 1960.
Suitability of . . . as Paper Filler, Tseluloza Khartiya 3, No. 3:13–16, dated Jun. 1972.
Chemistry and Technology of Lime and Limestone, Robert S. Boynton, pp. 113 and 128–140, Copyright 1980.
The Effects of Lime Quality and Dosage on Causticizing and Lime Mud Settling Properties, A.J. Campbell, pp. 1320–1324, dated 1985.
Beneficial Use of Spent Calcium Hydroxide from Fruit Cold Storage Warehouses, Land Technologies, Inc., Report No. IBP–97–1, dated Jan. 1997.

Primary Examiner—Dean T. Nguyen
(74) Attorney, Agent, or Firm—Dunlap, Codding & Rogers P.C.

(57) ABSTRACT

A method for obtaining particulate calcium carbonate having an average particle size less than about 12 microns is provided. The method includes the steps of (1) withdrawing from a pulp mill a mixture containing calcium carbonate; (2) treating the mixture to remove contaminants contained in the mixture to produce a treated mixture containing calcium carbonate and further having a chemical composition and/or purity which substantially inhibits the fusing together of calcium carbonate particulates; (3) recovering from the treated mixture particulate calcium carbonate having an average particle size less than about 12 microns. The calcium carbonate produced has a high surface area to volume ratio and is therefore highly reactive and suitable for numerous applications such as in the treatment of soil, filler paper production, paint production, and contaminant containment in coal stack emission assemblies.

8 Claims, 5 Drawing Sheets

METHOD FOR KRAFT WASTE RECLAMATION

CROSS-REFERENCE TO RELATED APPLICATIONS

This application is a continuation of U.S. Ser. No. 10/022,086, filed Dec. 18, 2001, entitled "KRAFT WASTE RECLAMATION METHODOLOGY;" now abandoned which is a continuation of U.S. Ser. No. 09/754,754, filed Jan. 4, 2001, entitled "KRAFT WASTE RECLAMATION METHODOLOGY," now abandoned; which is a continuation of U.S. Ser. No. 09/400,243, filed Sep. 21, 1999, entitled "METHOD OF OBTAINING AND USING PARTICULATE CALCIUM CARBONATE," now abandoned; which is a continuation of U.S. Ser. No. 08/861,333, filed May 21, 1997, entitled "METHOD OF OBTAINING AND USING PARTICULATE CALCIUM CARBONATE," now abandoned, the contents of all of which are incorporated herein in their entirety by reference.

FEDERALLY SPONSORED RESEARCH

NOT APPLICABLE

BACKGROUND OF THE INVENTION

1. Field of the Invention

The present invention relates in general to a method for obtaining particulate calcium carbonate and methods for using same, and more particularly, to a method for obtaining particulate calcium carbonate having an average particle size less than about 12 microns from a pulp mill and further having a chemical composition and/or purity which substantially inhibits the fusing together of the calcium carbonate particulates.

2. Background of the Art

Limestone, which is primarily calcium carbonate, has been quarried and processed for a wide variety of uses pre-dating the construction of the pyramids of Ancient Egypt. The direct use of limestone and the conversion of limestone to quicklime has continued unabated since that time for use in the construction of buildings and roads, as well as for glass formation and the purification of metals. The advent of the industrial and technical revolutions has continued the need for high quality calcium carbonate. However, the increased need for calcium carbonate has brought with it a demand for calcium carbonate particle sizes below that which can be accurately measured by a standard sieve analysis. Oftentimes, the particulate size requirement is only a few microns in diameter.

The use of calcium carbonate in agricultural settings and manufacturing applications is also well known in the art. Since World War II, increasing amounts of calcium carbonate materials have been spread on the soil of farms (hereinafter referred to as "liming") as a method of increasing the productivity of the soil and aligning the soil pH closer to neutral. In fact, the direct application of calcium carbonate to soil, is the greatest single agricultural use of calcium carbonate. Its use in agricultural applications during the 1940–1970 time span accounted for approximately 70–80% of the tonnage of calcium carbonate produced. For example, in Willamette Valley, Oreg., over 150,000 tons of limestone products are used each year for soil neutralization thereby increasing the yields of a number of products including grasses for seed.

Traditionally, the calcium carbonate material has been spread by self-unloading dump or tank-type trucks and the calcium carbonate has been applied to the land by plowing about half of the calcium carbonate under the soil and harrowing in the remaining half. More recently, the soaring price of fertilizer has made the spreading of particulate calcium carbonate an attractive and inexpensive option for farmers and other agricultural users. Indeed, it has been found that the preliminary treatment of agricultural plots with calcium carbonate is a prerequisite in order to reap the full value from such costly fertilizers.

The use of calcium carbonate is varied across a wide spectrum of applications. For instance, a preponderance of crops and plants grow most profusely under neutral to slightly acidic conditions. Thus, acidic soil in the pH range of 3.5–6.0 can be made more fertile and productive for many crops by neutralizing soil acids. Also, the essential plant nutrients, calcium and magnesium, are supplied directly to the plants to support plant growth. Through liming, microbiological activities in the soil are stimulated, thereby liberating other available plant nutrients from the soil organic matter. Indirectly, liming increases organic matter in the soil by fostering larger and more prolific growth. Greater volumes of roots and plant residues are retained in and on the soil and the earthworm population generally increases as the pH of the soil is elevated up to neutral.

Numerous problems have made the agricultural application of calcium carbonate incomplete: for instance, calcium carbonate of sufficient size and surface area is expensive to obtain and cannot be produced from larger sized calcium carbonate economically. Although liming has become a requisite in the agricultural industry, the application of calcium carbonate through liming has been partially ineffective, time intensive, and potentially over applied. Furthermore, the application of powdered calcium carbonate directly to the soil is ineffective, as well, because it tends to be blown away by the wind and requires lengthy treatment times to reach the desired soil pH level.

The numerous problems of the agricultural use of calcium carbonate are mirrored and amplified in the use of calcium carbonate for flue gas desulfurization for the reduction of acid rain, in the power industry. Although low sulfur coals have been utilized in order to reduce sulfur dioxide produced, thereby postponing the installation of expensive scrubbers, tightening environmental regulations will soon force power plants to also use flue gas desulfurization "scrubbing" techniques. However, the size of the calcium carbonate currently available for use, is too large, thereby leading to an substantially ineffective scrubbing process.

The dominant process for chemical pulping in the paper industry is the alkaline "Kraft" process which uses sodium hydroxide and sodium sulfide as the primary chemical constituents. In order to make the Kraft pulping process economically feasible, the chemicals are regenerated in a series of steps, including: 1) washing the spent chemicals and digested wood substance out of the "pulp" and collecting the resultant "weak black liquor" in large tanks; 2) evaporating the liquor in preparation for burning in a Kraft recovery boiler which produces steam for energy recovery and molten "smelt" for chemical recovery, wherein the smelt drops into a tank where it is mixed with water to form "green liquor" which contains sodium carbonate and sodium sulfide; 3) the sodium carbonate is reconverted to sodium hydroxide by using calcium oxide wherein the calcium oxide is converted into a finely divided calcium carbonate called "lime mud" suspended in a regenerated pulping liquor; and 4) the calcium oxide is regenerated by burning the lime mud in a lime kiln. Before the lime mud can be burned in a cost-effective way, however, the lime mud must be separated from the regenerated pulping liquor and washed. After intensive washing and denaturing steps, the lime mud contains primarily calcium carbonate with trace amounts of calcium hydroxide and sodium hydroxide. The calcium carbonate in the lime mud ranges in size from less than 1 to greater than 120 microns.

The regeneration of the chemicals in the Kraft pulping system, however, is not entirely effective. Typically, unreactive contaminants come from: (1) The wood used to make the pulp; (2) Corrosion and erosion of piping and equipment; (3) sulfur compounds from the pulping liquors; and (4) sulfur gasses burned in the rotary lime kiln. A residual level of contaminants in the lime mud results in a reburned lime having decreased causticizing efficiencies which translates into higher energy costs throughout the Kraft pulping process. Also, since the lime kiln is often the bottleneck to higher pulp production rates, contaminants in the reburned lime can decrease overall pulp production and concomitantly increase energy costs. If the pulp mill also has a bleach cycle, the contaminants lower the brightness control of the pulp, thereby increasing the bleaching costs of the pulp production system.

Thus it is an object of the present invention to provide a method of obtaining a particulate calcium carbonate having an average particle size less than about 12 microns from a pulp mill.

It is another object of the present invention to provide a method of optimizing the operation of the recausticizing cycle in a pulp mill thereby reducing the energy costs throughout the recausticizing cycle and maximizing pulp production.

It is a further object of the present invention to provide a method of applying a particulate calcium carbonate having an average particle size less than about 12 microns to a variety of applications wherein the size of the calcium carbonate particles is of concern.

These and other objects of the present invention will become apparent in light of the present Specification, claims, and Drawings.

SUMMARY OF THE INVENTION

The present invention comprises a method of obtaining particulate calcium carbonate having an average particle size less than about 12 microns. The method comprises the steps of a) withdrawing from a pulp mill a mixture containing calcium carbonate; b) treating the mixture to remove contaminants contained in the mixture to produce a treated mixture containing calcium carbonate; and c) recovering from the treated mixture particulate calcium carbonate having an average particle size less than about 12 microns.

In a preferred embodiment, the step of withdrawing from a pulp mill a mixture containing calcium carbonate further includes that the mixture containing calcium carbonate may be withdrawn from either the pulp mill lime mud storage tank, the discharge of the mud filter, or the pulp mill dust control system; from all of the pulp mill lime mud storage tank, the discharge of the mud filter, and the pulp mill dust control system; or from combinations thereof.

In yet another preferred embodiment, the step of withdrawing from a pulp mill a mixture containing calcium carbonate further includes that the mixture containing calcium carbonate is withdrawn from the pulp mill recausticizing cycle at a constant rate so as to require fresh calcium to be added to the recausticizing cycle at a rate greater than about 25 percent by weight of the requirements of the recausticizing cycle.

In another embodiment, the step of withdrawing from a pulp mill a mixture containing calcium carbonate further includes that the mixture containing calcium carbonate is being withdrawn from the pulp mill recausticizing cycle in staggered batches so as to require fresh calcium to be added to the recausticizing cycle at a rate greater than about 25 percent by weight of the requirements of the recausticizing cycle.

The present invention also contemplates a method of obtaining particulate calcium carbonate having an average particle size about 12 microns. The method comprises the steps of a) withdrawing from a pulp mill a mixture containing calcium carbonate; b) segregating the particulate calcium carbonate from the mixture containing calcium carbonate within the pulp mill prior to withdrawing the particulate calcium carbonate from the pulp mill; and c) recovering from the segregated particulate calcium carbonate, a particulate calcium carbonate having an average particle size less than about 12 microns.

The present invention further contemplates a method of optimizing the operation of the recausticizing cycle in a pulp mill. The method comprises the steps of a) withdrawing from the pulp mill recausticizing cycle a mixture containing particulate calcium carbonate; b) injecting an effective amount of a fresh calcium containing compound selected from the group consisting of either calcium oxide or calcium carbonate, into the recausticizing cycle to replace the withdrawn mixture; c) treating the withdrawn mixture to substantially remove contaminants in the mixture to produce a treated calcium carbonate mixture; and d) recovering from the treated calcium carbonate mixture a particulate calcium carbonate having an average particle size less than about 12 microns.

The present invention also contemplates a method of adjusting and enhancing the pH of soil. The method comprises the steps of a) withdrawing from a pulp mill a mixture containing calcium carbonate; b) treating the mixture to produce substantially contaminant free treated mixture containing particulate calcium carbonate having an average particle size less than about 12 microns; c) admixing an effective amount of water to the treated mixture containing calcium carbonate having an average particulate size of less than about 12 microns to provide a sprayable calcium carbonate slurry; and d) spraying an effective amount of the sprayable calcium carbonate slurry onto the soil to penetrate the soil to a predetermined depth in order to adjust the pH of the soil. Also, if the soil is low in magnesium, a magnesium containing compound, such as $Mg(OH)_2$, having a substantially similar particulate size as of that of the calcium carbonate, may be added to the slurry as well. If the soil is highly compacted, a penetrant aid may also be added to the slurry in order to allow the calcium carbonate to penetrate to the roots. The use of glacier water containing suspended micro-nutrients may also be used as a dilutant for the calcium carbonate slurry.

In a preferred embodiment of the invention, the method further comprises the steps of a) allowing a predetermined amount of time to elapse to permit the calcium carbonate in the sprayable slurry to penetrate the soil; and b) measuring the pH of the soil after the predetermined amount of time.

The present invention also comprises a method for reducing acid gas contaminants from furnace and post furnace regions of power boilers, recovery boilers, and other gas streams of such constituents. The method comprises the steps of a) withdrawing from a pulp mill a mixture containing calcium carbonate; b) treating the mixture to produce a substantially contaminant free treated mixture containing particulate calcium carbonate having an average particle size less than about 12 microns; and c) injecting an effective amount of the treated mixture containing calcium carbonate having an average particulate size of less than about 12 microns into a coal stack burning assembly.

The present invention further comprises a method for producing a filler for plastics and unbleached pulp or paper. The method comprises the steps of a) withdrawing from a pulp mill a mixture containing calcium carbonate; b) treating the mixture to produce substantially contaminant free treated mixture containing particulate calcium carbonate having an average particle size less than about 12 microns; and c) injecting an effective amount of the treated mixture calcium carbonate having an average particulate size of less than about 12 microns into a fiber producing assembly.

DETAILED DESCRIPTION OF THE INVENTION

Figure 1:
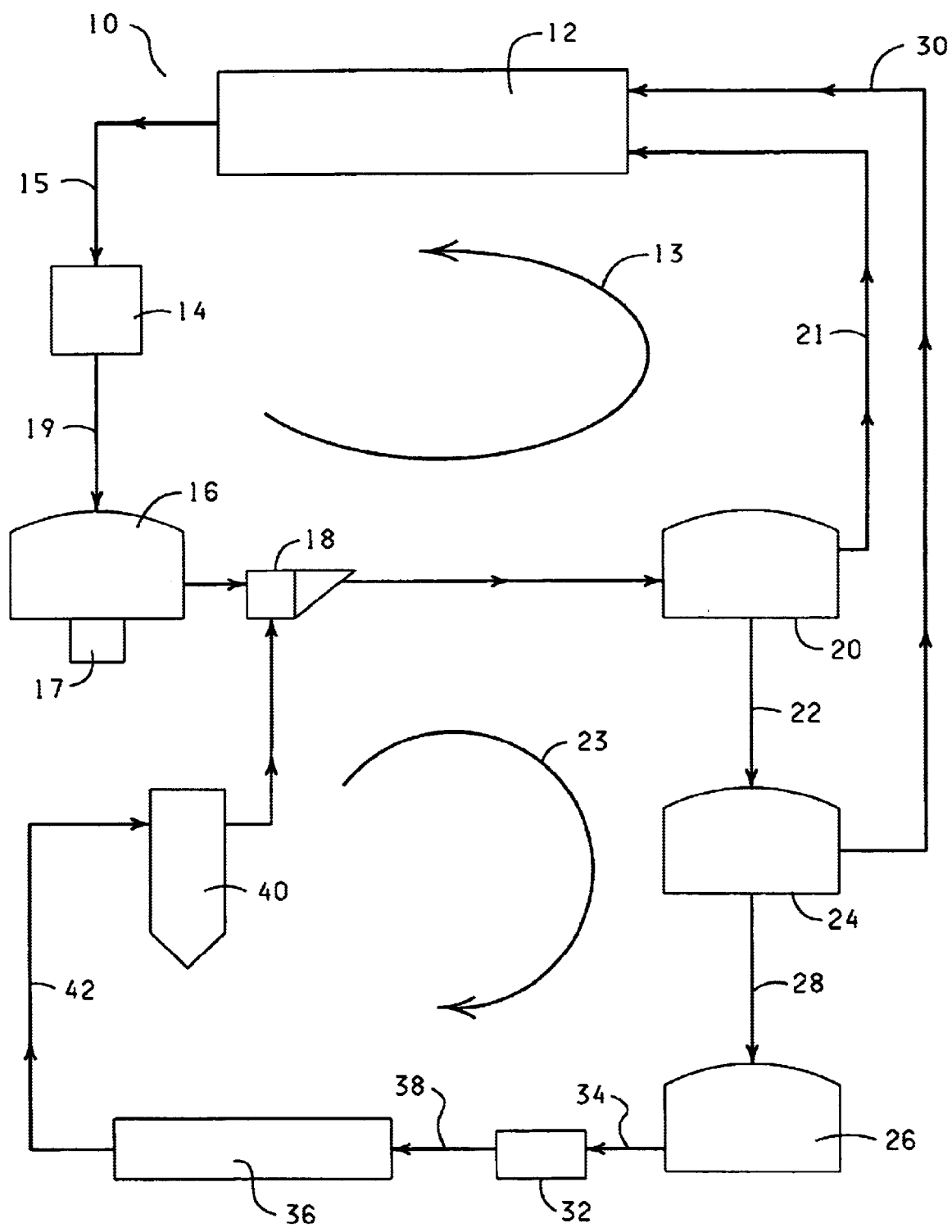
FIG. 1 is a diagrammatic representation of the pulping and recausticizing cycles of a Kraft pulping mill.

Before explaining at least one embodiment of the invention in detail, it is to be understood that the invention is not limited in its application to the details of construction and the arrangements of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The present invention provides a method for obtaining particulate calcium carbonate having an average particle size less than about 12 microns. The method comprises the steps of withdrawing from a pulp mill a mixture containing calcium carbonate, treating the mixture to remove contaminants contained in the mixture to produce a treated mixture containing calcium carbonate, and recovering from the treated mixture calcium carbonate having an average particle size less than about 12 microns. Thereby, calcium carbonate is produced from a Kraft pulp mill recausticizing cycle. Calcium carbonate from the pulp mill is formed, classified and segregated under controlled conditions which provide for the calcium carbonate necessary for strict industrial and agricultural specifications. The method of the invention produces a calcium carbonate having 1) reduced quantities of trace contaminants; 2) smaller overall average particle size; and/or 3) a mixture segregated into specific size ranges.

Pulping and recausticizing cycles 10 of a Kraft pulp mill are shown generally in FIG. 1. A Kraft pulping process 12 generally includes the combining of sodium hydroxide and sodium sulfide and organic wood matter. The sodium hydroxide and sodium sulfide solubilize the lignin in the organic wood matter thereby releasing the wood fibers which are tied together in the organic wood matter by the lignin. In particular, the sodium binds with the lignin which in turn solubilizes the lignin. After the lignin has been chemically removed from the organic wood matter, the released wood fibers are removed from the process and used in other paper making processes. The solubilized lignin, excess sodium hydroxide and sodium sulfide, and other trace impurities are washed out of the wood fibers and placed into a recovery boiler. In the recovery boiler, the organic matter is burned off and sodium carbonate and sodium sulfide are produced. The sodium carbonate and sodium sulfide combination is generally referred to as "smelt", and is moved from the Kraft pulping process 12 to a smelt dissolving tank 14 via smelt dissolving tank conduit 15.

In the smelt dissolving tank 14, the smelt is mixed with water to form a slurry commonly referred to as a "Green Liquor." The Green Liquor is then moved from the smelt dissolving tank 14 to a Green Liquor clarifier 16 via Green Liquor clarifier conduit 19. The Green Liquor contains, in addition to the sodium carbonate and sodium sulfide, trace amounts of solids such as burned dark carbon and metallics. The Green Liquor clarifier 16 separates the liquid (which contains the sodium carbonate and sodium sulfide) from the solids. The Green Liquor clarifier 16 settles the solids out of solution and an outlet 17 allows for the controlled removal of the solids in such a manner as to minimize the removal of the liquid. In such a manner, the Green Liquor is substantially cleaned of solid contaminants.

The clean Green Liquor thereafter leaves the Green Liquor clarifier 16 and enters a slaker 18. The slaker 18 introduces an amount of calcium oxide to the Green Liquor (which contains sodium carbonate and sodium sulfide). The calcium oxide therein reacts with the sodium carbonate to produce sodium hydroxide and calcium carbonate, while the sodium sulfide remains in solution and does not react. The calcium carbonate precipitates out of solution and the solution which contains the sodium hydroxide and sodium sulfide is commonly referred to as a "White Liquor." After the reaction has occurred, the precipitated calcium carbonate and the White Liquor are moved to a White Liquor clarifier 20.

The White Liquor clarifier 20 separates the White Liquor solution from the precipitated calcium carbonate. The White Liquor solution is conveyed back to the Kraft pulping process 12 via the White Liquor conduit 21. The White Liquor, containing sodium hydroxide and sodium sulfide, is therein reused to separate the wood fibers from the lignin in the Kraft pulping process 12, as described hereinabove.

The precipitated calcium carbonate (also referred to as "lime mud") in White Liquor clarifier 20 is removed from White Liquor clarifier 20 and conveyed to mud washer 24 via lime mud conduit 22. The lime mud which exits the White Liquor clarifier 20 is approximately 50% calcium carbonate suspended in a residual amount of White Liquor. Mud washer 24 adds water to the lime mud and White Liquor suspension in order to dilute the lime mud further. After the water has been added to the lime mud, the lime mud is allowed to settle out of the solution. The lime mud is then removed from the mud washer 24 and conveyed to the mud storage 26 via mud storage conduit 28. The remaining diluted White Liquor in mud washer 24 is pumped into the Kraft pulping process 12 by White Liquor pumping apparatus 30.

The lime mud entering the mud storage 26 is approximately 25–35% solids. Further, the calcium carbonate in the lime mud ranges in size from less than 1 micron to greater than 120 microns. The lime mud is thereafter conveyed from mud storage 26 to a mud filter 32 via a mud filter conduit 34. The mud filter 32 washes the lime mud with water and separates the lime mud from the resulting solution. After the washing, the lime mud is removed from the mud filter 32 and transported to a rotary lime kiln 36 via rotary lime kiln conduit 38. The lime mud leaving the mud filter 32 and entering rotary lime kiln 36 is approximately 70–80% solids.

The rotary lime kiln 36 converts the calcium carbonate in the lime mud to calcium oxide through a calcination process. After the calcination process has finished, the converted calcium oxide is transported to a storage silo 40 by means of a silo conduit 42. The storage silo 40 holds the converted calcium oxide until it is needed by the slaker 18 in the conversion of sodium carbonate and calcium oxide to sodium hydroxide and calcium carbonate. In this manner, the sodium hydroxide and sodium sulfide used in the Kraft pulping process 12 are repeatedly regenerated for subsequent use.

The pulping and recausticizing cycles of the Kraft pulp mill, described above, oftentimes accumulate unreactive contaminants, such as 1) contaminants from the particular wood that is used for pulping, 2) unburned contaminants from the Kraft pulping process, 3) iron compounds from mill conduit piping, and 4) various other impurities found in the chemicals introduced into the process in order to make up the chemical losses which occur during processing. Furthermore, unreactive calcium sulfate may be formed from sulfur dioxide which reacts with the calcium oxide within the rotary lime kiln 36. Contaminant build-up results in 10 to 20% more calcium oxide (reburned lime) being needed in the slaker 18 for each conversion reaction of sodium carbonate to sodium hydroxide and calcium carbonate. The contaminants may also fuse the small calcium carbonate particles produced in the conversion reaction of sodium carbonate to sodium hydroxide into larger calcium carbonate agglomerates which tend to make them less desirable and/or less reactive.

Figure 2:
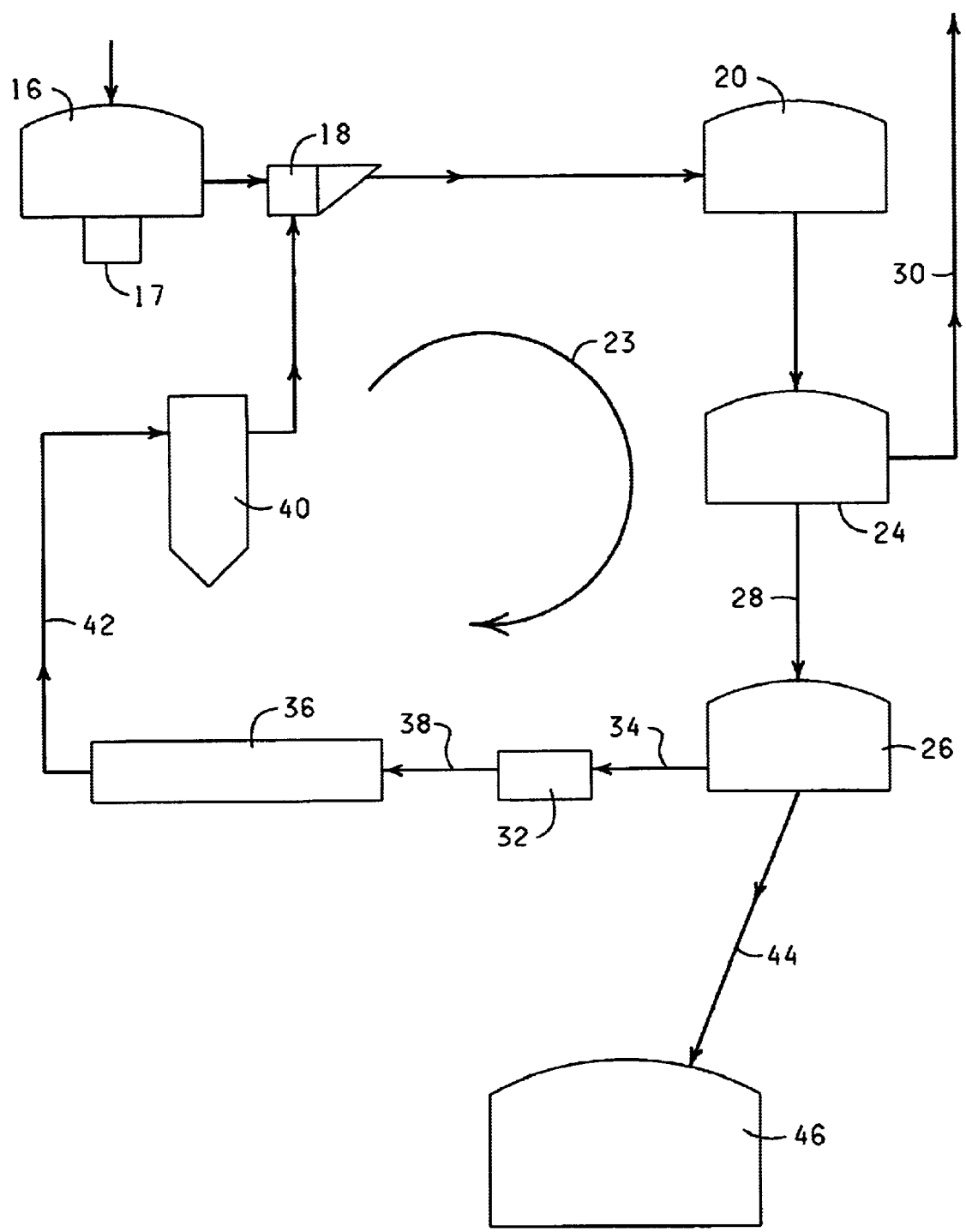
FIG. 2 is a diagrammatic representation of the recausticizing cycle of a Kraft pulping mill of the present invention.

The present invention, as shown in FIG. 2, contemplates the removal of the precipitated calcium carbonate from the recausticizing cycle 23, treating the recovered precipitated calcium carbonate to remove any residual contaminants remaining therein, and recovering from the treated mixture a particulate calcium carbonate having an average particle size less than about 12 microns. As described above, the precipitated calcium carbonate enters White Liquor clarifier 20 which thereby separates the White Liquor solution from the precipitated calcium carbonate. The precipitated calcium carbonate is then conveyed to mud washer 24 via lime mud conduit 22. After being washed, the lime mud is conveyed to mud storage 26 via mud storage conduit 28. The precipitated calcium carbonate and any residual White Liquor solution is thereafter removed from mud storage 26 to a storage assembly 46 via a storage assembly conduit 44. It is also contemplated that any excess soluble hydroxide can be treated by either (1) oxidizing the mud in the mud storage in order to stabilize the sulfides and/or (2) using carbonated water to wash the mud on the mud filter.

Figure 3:
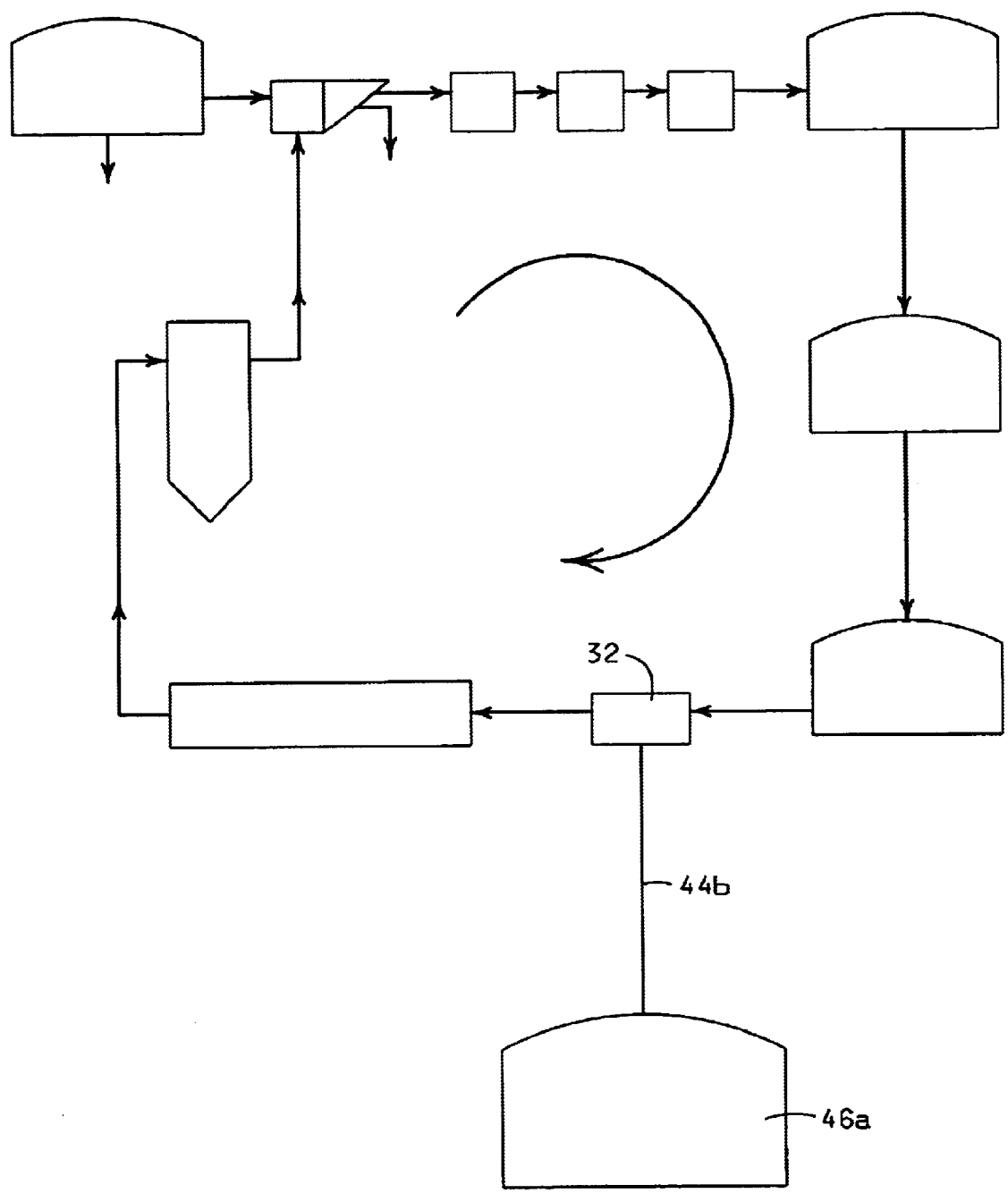
FIG. 3 is a diagrammatic representation of the recausticizing cycle of a Kraft pulping mill a second embodiment of the present invention.
Figure 4:
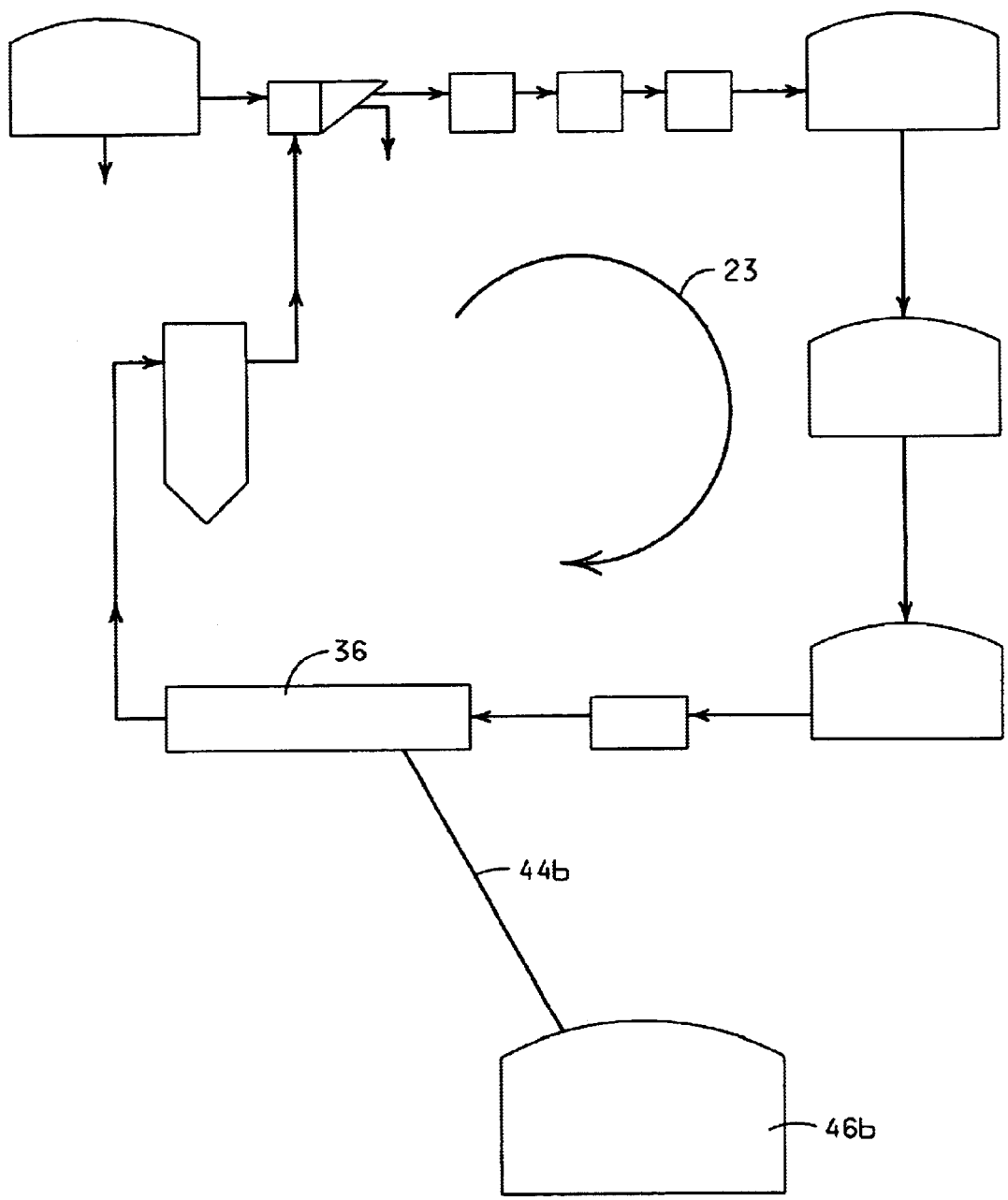
FIG. 4 is a diagrammatic representation of the recausticizing cycle of a Kraft pulping mill a fifth embodiment of the present invention.
Figure 5:
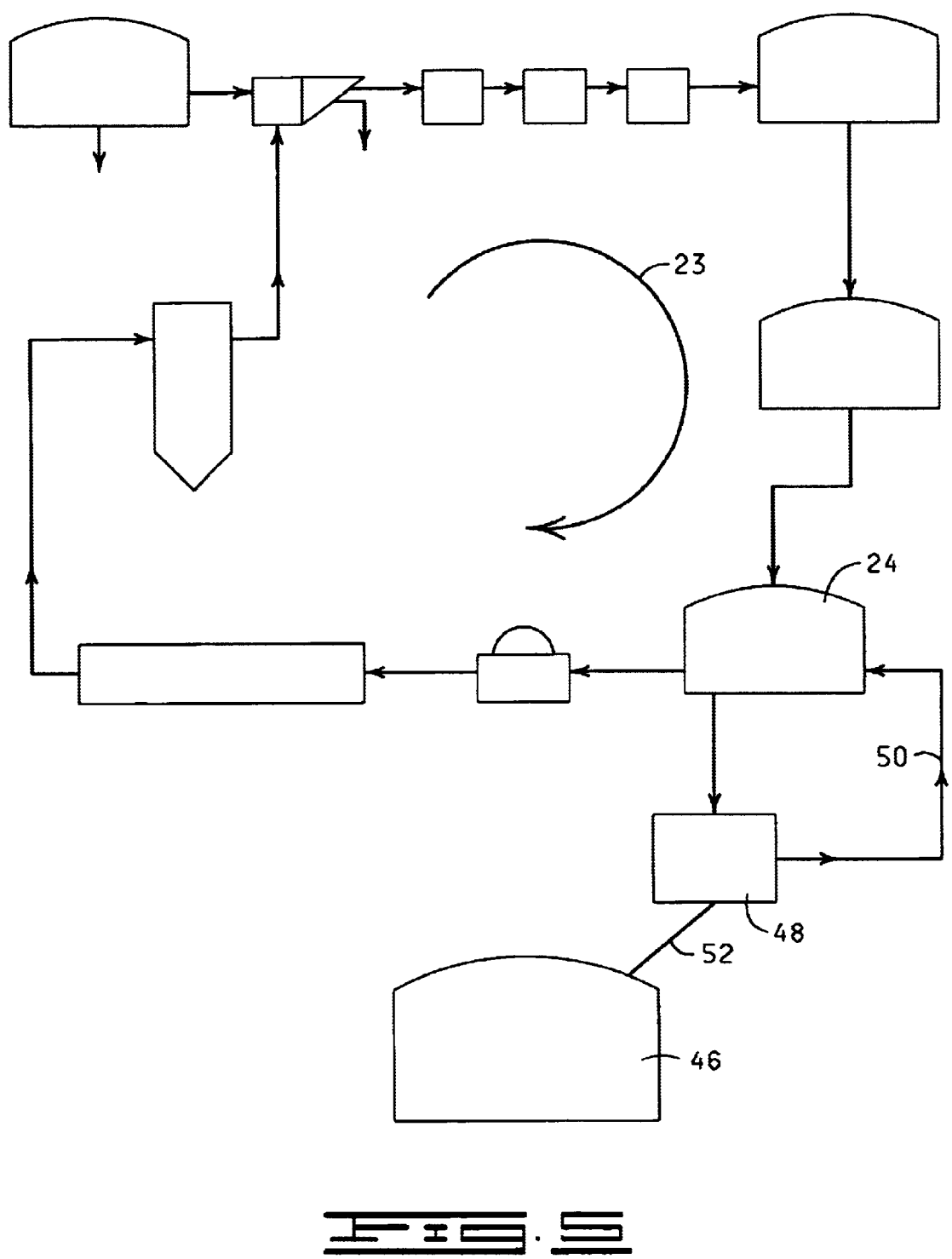
FIG. 5 is a diagrammatic representation of the recausticizing cycle of a Kraft pulping mill a fourth embodiment of the present invention.

It is also contemplated, and as shown in FIG. 3, that the untreated calcium carbonate solution be withdrawn from mud filter 32 to a storage assembly 46a via a storage assembly conduit 44a. Furthermore, the calcium carbonate, as shown in FIG. 4, may be removed from the rotary lime kiln 36 to a storage assembly 46b via a storage assembly conduit 44b, or from rotary lime kiln dust screens (not shown) or by any combination thereof. By choosing the withdrawal site of the untreated calcium carbonate solution, the calcium carbonate particle size distributions can be more exactingly controlled. It is also contemplated that calcium carbonate particles having an average size less than about 12 microns be removed from the recausticizing cycle 23, as shown in FIG. 5, by pumping the solution from the mud storage 26 through a hydrocyclone 48 or other classification device. The material having an average size greater than about 12 microns is returned to the mud storage 26 via a return conduit 50. The material having an average size less than about 12 microns is conveyed to the storage assembly 46 via conduit 52 for further treatment and/or segregation.

The calcium carbonate taken off mud filter 32, which is typically at about 70–80% solids, may be dried with a small rotary dryer or other drying device (not shown) in order to provide a calcium carbonate which may be more economically and efficiently shipped. For certain applications, sufficient dryness could be obtained by adding additional calcium oxide or calcium carbonate to the removed and treated calcium carbonate, followed by drying the combination with a rotary dryer. It would be apparent to one of ordinary skill in the art that any method which can efficiently dry the removed calcium carbonate is contemplated for use.

Storage assembly 46 is a storage facility capable of treating the calcium carbonate solution in order to further remove any residual contaminants which may be in the solution. The calcium carbonate treatment may consist of single or multiple washings with water or any other suitable chemical treatment. It is also contemplated that the calcium carbonate treatment involve a chemical treatment, whereby any impurities or contaminants in the mixture are solubilized and removed and/or the impurities or contaminants may be converted to some harmless or beneficial by-product. It is also contemplated that two or more diluting and/or rethickening steps may be required in order to remove the impurities or contaminants. Also, if the calcium carbonate solution contains excess sodium, the storage assembly 46 may also contain a conductivity meter capable of measuring the amount of sodium contaminants in the solution and maximize the purification treatment of the calcium carbonate solution to remove the contaminant sodium. In particular, the conductivity of the calcium carbonate solution should be less than 1800 micromhos. In any event, one of ordinary skill in the art would understand that any method of treating the precipitated calcium carbonate solution, so as to substantially remove impurities of contaminants remaining therein, is contemplated for use.

The storage assembly 46 is also capable of recovering, from the above-described treated calcium carbonate, a particulate calcium carbonate having an average particle size less than about 12 microns. In one embodiment, the storage assembly 46 may contain a hydrocyclone, or other such classification device which would be known to one of ordinary skill in the art. The hydrocyclone, or other segregation device, is capable of removing a particular range of particle sizes based upon the unit design and the resultant pressure drop across the unit. In terms of operational control, a higher pressure drop shifts the particle size split so that the discharge from the top of the cyclone contains less total mass flow of the particulate calcium carbonate, but will contain particulate calcium carbonate having a smaller particle size. It is also contemplated that the recovery of particulate calcium carbonate having an average size less than about 12 microns may involve more than one segregation step. For instance, two or more passes through the hydrocyclone or other segregation device may be required in order to obtain a calcium carbonate particulate having an average size less than 12 microns.

Alternate methods may be employed within the storage assembly 46 in order to segregate out a particulate calcium carbonate having an average particle size less than 12 microns. A settling chamber or clarifier may be included with the storage assembly 46 which allows the larger particles to settle out of solution first, thereby allowing for the preferential selection of smaller particles. Also, a liquid grinding or impacting assembly may be included in the storage assembly 46 in order to break up larger sized particles that may escape removal by the hydrocyclone or other segregating device. Of course, any of these segregating devices may be used singularly or in combination with any of the others and may also comprise an additional assembly separate from, yet connected to, storage assembly 46. In any event, one of ordinary skill in the art will understand that any method of segregating a calcium carbonate particulate having an average particle size less than 12 microns out of solution, is contemplated for use.

Pulp mills traditionally operate the recausticizing cycle so that up to 1.5% sodium, expressed as $Na_2O$, is in the process since this amount of sodium helps to reduce dust and encourages the formation of a pellet sized calcium oxide product. This minute level of sodium, however, causes the calcium carbonate to form agglomerates of an increased size, as described hereinabove. In this regard, the effect of the sodium on the calcium carbonate appears to be cumulative. In order to minimize the number of calcium carbonate agglomerates formed, the calcium carbonate is preferentially removed from the mud storage 26 before it has been through rotary lime kiln 36.

Currently, pulp mills add approximately 5% calcium oxide to the recausticizing cycle (hereinafter referred to as "new lime") in order to purge an amount of the contaminants formed during each cycle. Even with this purge in the recausticizing cycle, however, the amount of contaminants in the system is such that the contamination levels in the cycle are increased by a factor of twenty. The effectiveness of any contaminant purge is expressed by the "percentage available calcium oxide" found in the material leaving rotary lime kiln 36. For example, calcium oxide produced in the rotary lime kiln 36 often has less than eighty-five percent (85%) calcium oxide available, whereas new lime has greater than ninety-two percent (92%) calcium oxide available. Therefore, the more calcium oxide produced in the rotary lime kiln 36 that is used for each ton of pulp produced, causes several dead load costs. Furthermore, if the rotary lime kiln 36 is the bottleneck in the recausticizing cycle 23, there is a correlative loss in pulp production in the sodium cycle 13.

It is contemplated that the removal of the calcium carbonate from the recausticizing cycle 23 be accomplished in such a manner so that new calcium, such as calcium oxide, be added to the recausticizing cycle 23 at a rate greater than about 25 percent by weight of the requirements of the recausticizing cycle 23. The mixture containing the calcium carbonate may be withdrawn from the recausticizing cycle 23 in either a continuous stream or in staged increments, so long as the 25 percent by weight withdrawal requirement is met.

The present invention also contemplates the optimization of a Kraft pulp mill. The method of optimizing the Kraft pulp mill includes the steps of: (A) withdrawing from the pulp mill recausticizing cycle a mixture containing particulate calcium carbonate; (B) injecting an effective amount of a fresh calcium containing compound selected from the group consisting of calcium oxide and calcium carbonate, into the recausticizing cycle to replace the withdrawn mixture; (C) treating the withdrawn mixture to substantially remove contaminants in the mixture to produce a treated calcium carbonate mixture; and (D) recovering from the treated calcium carbonate mixture a particulate calcium carbonate having an average particle size less than about 12 microns.

It is contemplated that the calcium carbonate be withdrawn at a rate greater than 5% and that the new lime be introduced into storage silo 40 thereby substantially purging the recausticizing cycle 23 of contaminants, and eliminating the rotary lime kiln 36 as a pulp mill pulp production bottleneck. Traditionally, the limiting factor on the degree of the purge was based on economic considerations since the purged "lime mud" or calcium carbonate mixture had to be hauled away or stored in some manner. If the rotary lime kiln 36 is the bottleneck to higher pulp production rates, reducing the amount of calcium oxide needed to be produced by the rotary lime kiln 36 results in the calcium oxide being added to the slaker having a higher percent available calcium oxide content which thereby translates into increased pulp production capacity without a significant capital expenditure. The optimization of the recausticizing cycle 23 of the pulp mill translates into lower overall energy costs within Kraft pulping process 12. It is also contemplated that any residual moisture in the calcium carbonate may be reduced and/or eliminated by passing it through an additional rotary dryer or by using the existing rotary lime kiln as a dryer if production requirements are not affected.

If calcium carbonate is removed from the rotary lime kiln 36 or dust screens, calcium carbonate dust levels within the rotary lime kiln 36 will be minimized. Kraft pulp mills that utilize bleach plants will benefit from better brightness control and lower bleaching costs due to the decrease in pulp mill contaminants that are removed with the calcium carbonate and the increased reactivity of the calcium oxide that is introduced into slaker 18.

Furthermore, the rotary lime kiln 36 is the back end of the pulping process and there is a general lack of knowledge in the field as to the recausticizing cycle. For example, pulp mills generally do not have a different set of specifications and procedures for the addition of fresh calcium oxide. In fact, operators often attribute poor settling of the calcium oxide mud with the addition of fresh calcium oxide in general, rather than the fact that there may be too high a concentration of calcium oxide in the recausticizing cycle overall. It is contemplated that fresh calcium oxide, therefore, be added at a rate of 10–20% less than the amount of calcium oxide produced by the rotary lime kiln 36. The calcium oxide mud produced by the addition of 10–20% less fresh calcium oxide versus calcium oxide produced in the rotary lime kiln 36 settles very quickly even though the particle size is much smaller.

It is contemplated that the calcium carbonate produced by the present invention will also benefit users of calcium carbonate products by lowering the capital costs inherent in traditional methods of processing calcium carbonate, such as manual grinding or crushing systems. Rather than expensive rock handling and grinding equipment, the optimization of pulp mill operations and the resultant production of calcium carbonate requires minimal (1) wet or dry product storage; (2) transfer and transport equipment; and (3) classification or segregation equipment. The present invention, therefore, contemplates a method of optimizing a pulp mill recausticizing cycle and in return producing a particulate calcium carbonate product which is highly reactive and economically produced.

The present invention also contemplates a method for adjusting and enhancing the pH of the soil. The method generally entails the use of the calcium carbonate particles removed from a Kraft pulp mill. In particular, the method comprises the steps of (A) withdrawing from a pulp mill a mixture containing calcium carbonate; (B) treating the mixture to produce a substantially contaminant free treated mixture containing particulate calcium carbonate having an average particle size less than about 12 microns; (C) admixing an effective amount of water to the treated mixture containing calcium carbonate having an average particulate size of less than about 12 microns in order to provide a sprayable calcium carbonate slurry; and (D) spraying an effective amount of the sprayable calcium carbonate slurry onto the soil in order to penetrate the soil to a predetermined depth in order to adjust the pH of the soil. The method may also comprise the additional steps of (1) allowing a predetermined amount of time to elapse in order to permit the calcium carbonate in the sprayable slurry to penetrate the soil; and (2) measuring the pH of the soil after the predetermined amount of time. In this manner the soil may be treated so as to neutralize its acidic nature through a method which is quick, efficient, and easily administered.

Particle size for agricultural calcium carbonate traditionally averages 84 microns or more. With an average particle size of less than 12 microns, the full benefit of the calcium carbonate treatment will be recognized in the same growing season as its application. The small particle size of the calcium carbonate removed from the pulp mills, which is less than about 12 microns, is well below the particle size of ground calcium carbonate which is currently produced and used by the agriculture industry. In fact, attempting to grind limestone to a particle size of less than about 12 microns would be economically infeasible. Furthermore, the relatively small size of the removed calcium carbonate results in a product having a high volume to surface area ratio. Thus, the removed and treated calcium carbonate is highly reactive and results in a relatively inexpensive and effective soil treatment.

It is also contemplated that the removed and treated calcium carbonate can further be improved by grinding the particles into a desired size range even less than 12 microns through the use of a touch-up grinder. For instance, the power industry often uses calcium carbonate to scrub sulfur dioxide from their flue gases which are exhausted into the atmosphere. In order to maximize the calcium carbonate's reaction and application efficiency, it is ground to its smallest economic particle size.

The present invention also contemplates a method for reducing acid gas contaminants from furnace and post furnace regions of power boilers, recovery boilers, and other gas streams of such constituents. The method comprises the steps of (1) withdrawing from a pulp mill a mixture containing calcium carbonate; (2) treating the mixture to produce a substantially contaminant free treated mixture containing particulate calcium carbonate having an average particle size less than about 12 microns; and (3) injecting an effective amount of the treated mixture containing calcium carbonate having an average particulate size of less than about 12 microns into a coal stack burning assembly. The calcium carbonate injected into the coal stack burning assembly is highly reactive with the acid gases, such as $SO_2$, HCl, because of its high surface area to volume ratio. The calcium carbonate reacts with the acid gases to produce calcium sulfite, calcium sulfate and calcium chloride and $H_2O$, thereby lowering the amount of acid gases emitted from the coal stack burning assembly. In such a manner, the amount of acid gas contaminants is substantially reduced.

The present invention further contemplates a method for producing a filler for unbleached pulp or paper. The method comprises the steps of (1) withdrawing from a pulp mill a mixture containing calcium carbonate; (2) treating the mixture to produce a substantially contaminant free treated mixture containing particulate calcium carbonate having an average particle size less than about 12 microns; and (3) injecting an effective amount of the treated mixture calcium carbonate having an average particulate size of less than about 12 microns into a fiber producing assembly.

Because of its lower brightness, the calcium carbonate produced by the invention would have to be bleached in order that it be used in the production of paper from pulp. The brightness of the particulate calcium carbonate can also be enhanced by the addition of bleaching agents at the lime mud filter. However, it may be used in unbleached paper and paper board, and its use in such a product would cut pulp costs. However, even if the produced calcium carbonate is too dark to put into unbleached linerboard or sack paper, it may be treated with a bleaching agent and thereby improve its brightness.

The calcium carbonate produced by the invention could also be readily used as a substitute for ground calcium carbonate which is used in the manufacture of some types of paints which do not require a normal brightness factor, such as for use in dark colors of paint. It is also contemplated that the calcium carbonate could be bleached to improve the final brightness of the paint. As with paint, the addition of the calcium carbonate to plastics is also contemplated after bringing the product to dryness.

Thus, it should be apparent that there has been provided in accordance with the present invention a method for obtaining particulate calcium carbonate having an average particle size less than about 12 microns that fully satisfies the objectives and advantages set forth above. Although the invention has been described in conjunction with specific embodiments thereof, it is evident that many alternatives, modifications and variations will be apparent to those skilled in the art. Accordingly, it is intended to embrace such alternatives, modifications and variations that fall within the spirit and broad scope of the appended claims.

What we claim is:

1. A method for obtaining particulate calcium carbonate product having an average particle size less than 12 microns, comprising the steps of:

adding calcium to a recausticizing cycle of a kraft pulp mill at a rate greater than 25 percent by weight of the requirements of the recausticizing cycle;

withdrawing from the kraft pulp mill an alkaline mixture containing calcium carbonate wherein the alkaline mixture containing calcium carbonate is withdrawn during the recausticizing cycle;

treating the alkaline mixture containing calcium carbonate so as to remove contaminants contained in the alkaline mixture to thereby produce a treated alkaline mixture substantially free of contaminants and containing calcium carbonate; and recovering from the treated alkaline mixture a particulate calcium carbonate product having an average particle size less than 12 microns, wherein the treated alkaline mixture has been treated such that the particulate calcium carbonate product has a substantially neutral pH.

2. The method of claim 1, wherein the mixture containing calcium carbonate is withdrawn from a lime mud storage tank.

3. The method of claim 1, wherein the mixture containing calcium carbonate is withdrawn from a discharge of the mud filter.

4. The method of claim 1, wherein the mixture containing calcium carbonate is withdrawn from a pulp mill dust control system.

5. The method of claim 1, wherein the mixture containing calcium carbonate is withdrawn from a plurality of a lime mud storage tanks, a mud filter, a pulp mill dust control system, and combinations thereof.

6. The method of claim 1, wherein the calcium added is selected from the group consisting of calcium oxide, calcium carbonate and combinations thereof.

7. The method of claim 6, wherein the calcium added has an average particle size greater than 12 microns.

8. The method of claim 1, wherein the contaminants moved from the alkaline mixture containing calcium carbonate are selected from the group consisting of sodium compounds, sulfide compounds and combinations thereof.

* * * * *

UNITED STATES PATENT AND TRADEMARK OFFICE
CERTIFICATE OF CORRECTION

PATENT NO.    : 6,719,879 B2
DATED         : April 13, 2004
INVENTOR(S)   : Gary Allen Olsen et al.

It is certified that error appears in the above-identified patent and that said Letters Patent is hereby corrected as shown below:

Column 12,
Line 2, delete the word "moved" and substitute therefore -- removed --.

Signed and Sealed this

Twenty-ninth Day of June, 2004

JON W. DUDAS
*Acting Director of the United States Patent and Trademark Office*